E. D. SCHMITT.
STAMP OR TICKET VENDING MACHINE.
APPLICATION FILED JAN. 23, 1908. RENEWED APR. 1, 1909.
938,900.
Patented Nov. 2, 1909.
4 SHEETS—SHEET 1.
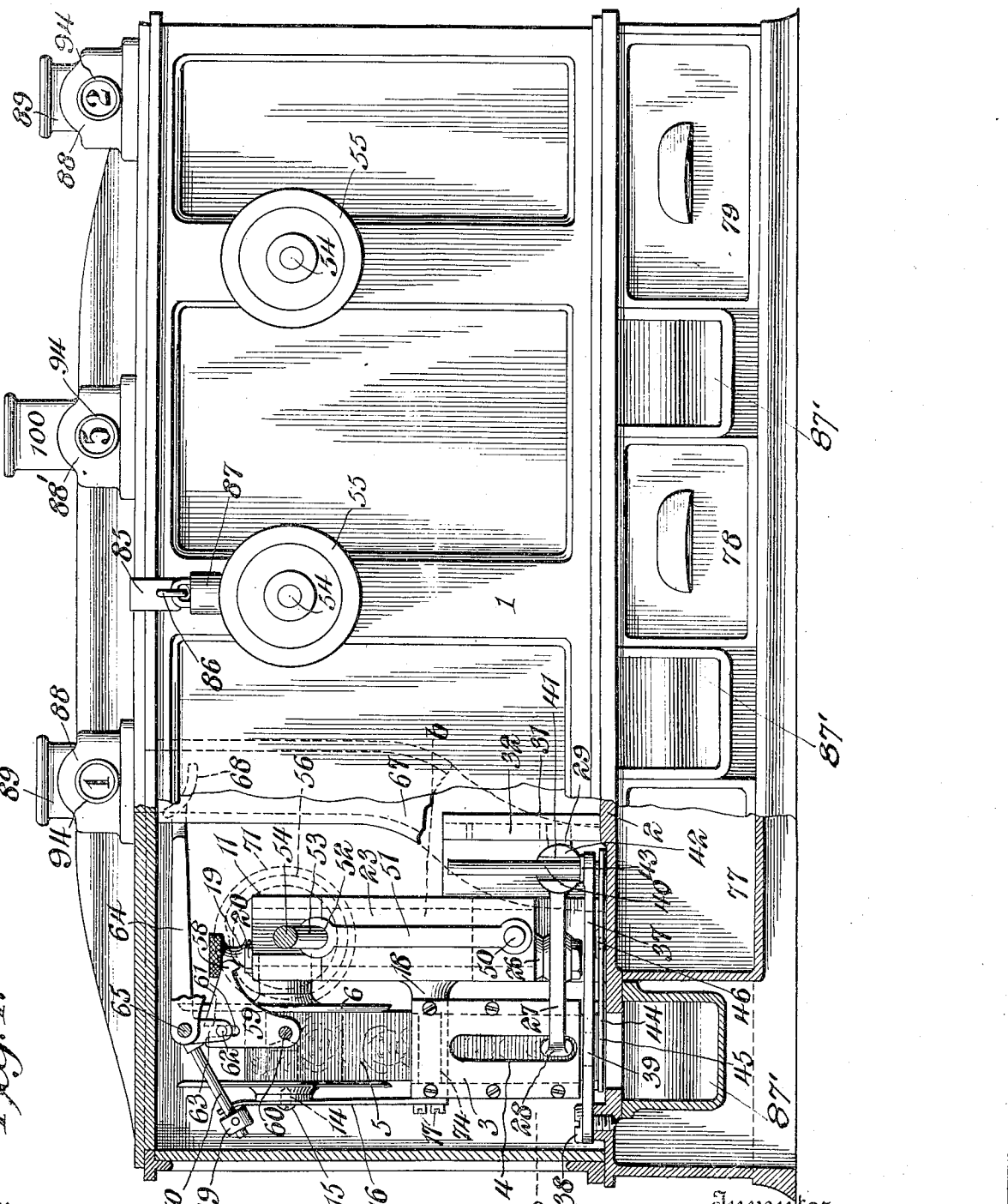

E. D. SCHMITT.
STAMP OR TICKET VENDING MACHINE.
APPLICATION FILED JAN. 23, 1908. RENEWED APR. 1, 1909.
938,900.
Patented Nov. 2, 1909.
4 SHEETS—SHEET 2.
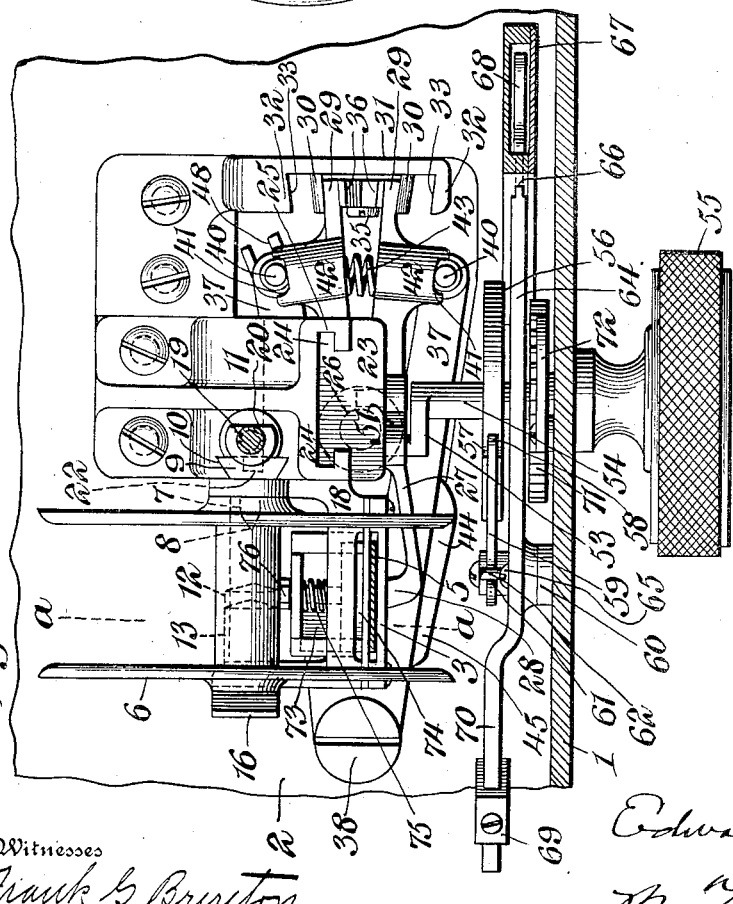

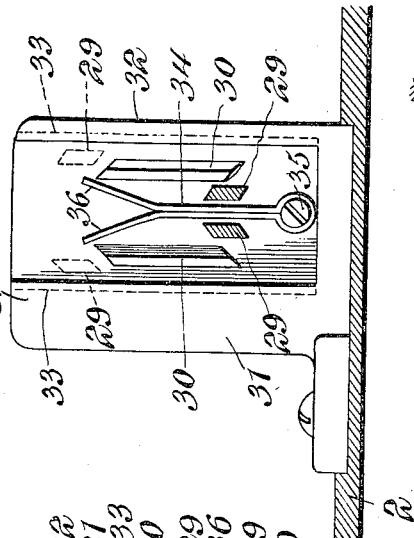
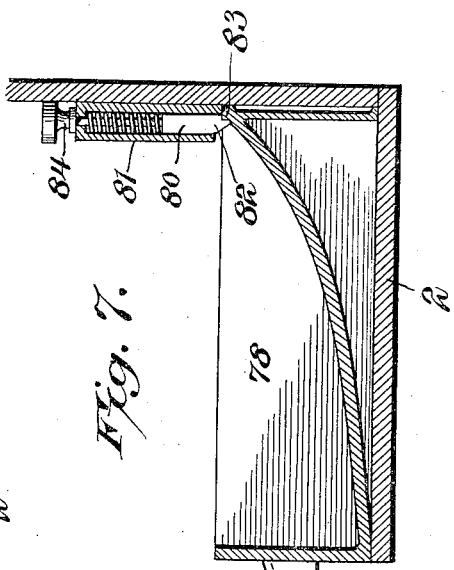
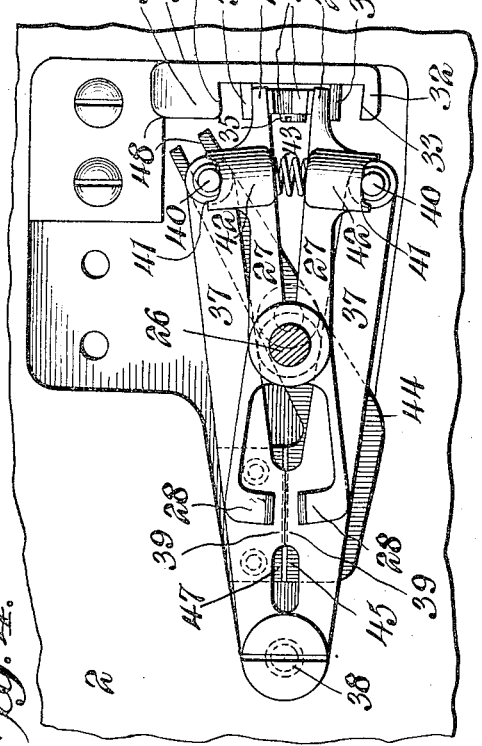
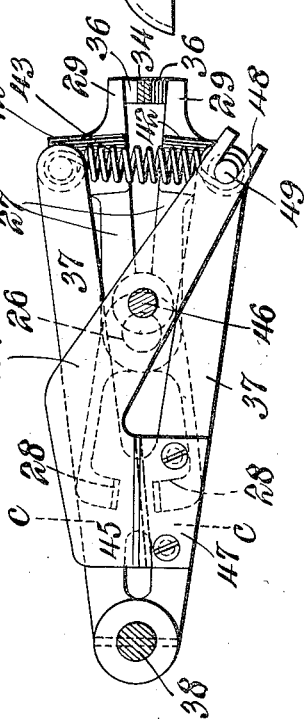

E. D. SCHMITT.
STAMP OR TICKET VENDING MACHINE.
APPLICATION FILED JAN. 23, 1908. RENEWED APR. 1, 1909.
938,900.
Patented Nov. 2, 1909.
4 SHEETS—SHEET 4.
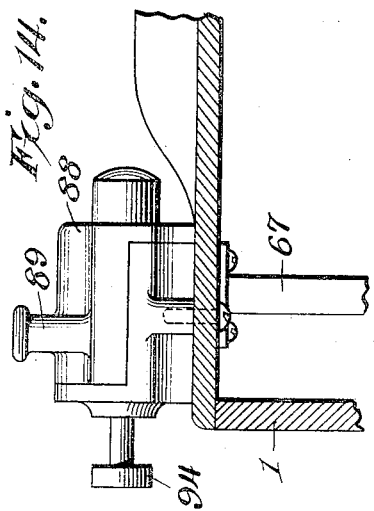
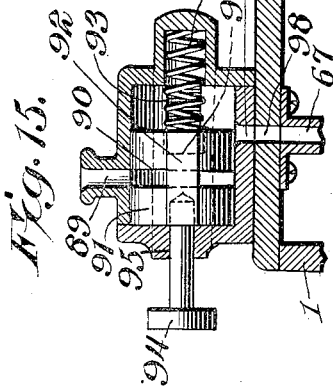
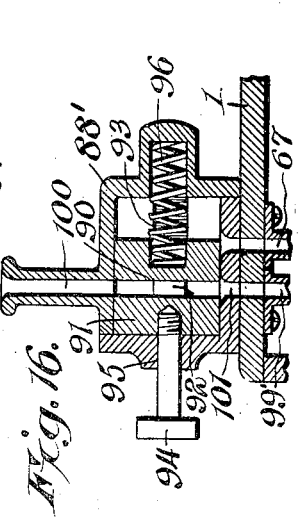
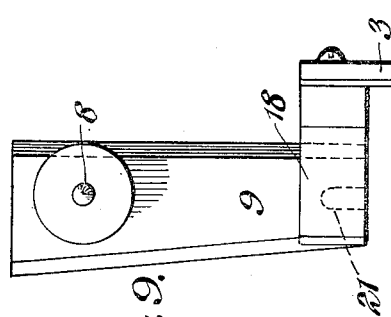
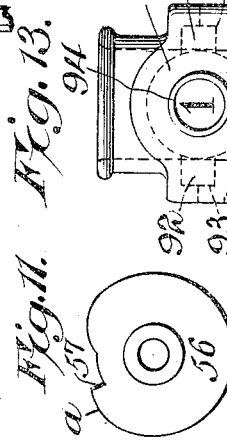
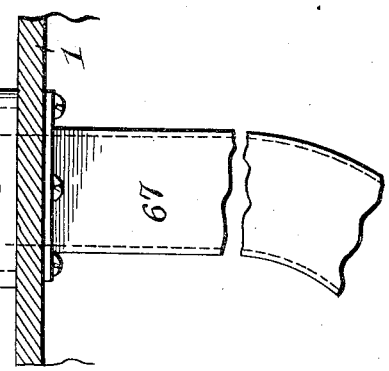
Witnesses
Frank G. Brereton
F. F. F. Johnson
Inventor
Edward D. Schmitt
By Ethan W. Johnson
Attorney

UNITED STATES PATENT OFFICE.

EDWARD D. SCHMITT, OF BALTIMORE, MARYLAND, ASSIGNOR, BY DIRECT AND MESNE ASSIGNMENTS, TO INTERNATIONAL VENDING MACHINE COMPANY, OF BALTIMORE, MARYLAND, A CORPORATION OF DELAWARE.

STAMP OR TICKET VENDING MACHINE.

938,900.   Specification of Letters Patent.   Patented Nov. 2, 1909.

Application filed January 23, 1908, Serial No. 412,286. Renewed April 1, 1909. Serial No. 487,340.

*To all whom it may concern:*

Be it known that I, EDWARD D. SCHMITT, a citizen of the United States, residing at Baltimore city and State of Maryland, have invented certain new and useful Improvements in Stamp or Ticket Vending Machines, of which the following is a specification.

This invention relates to machines for vending stamps, tickets or similar articles.

There was issued to me on September 24, 1907, Patent Number 866,891, stamp or ticket vending machines, in which many of the features of the machine about to be described are shown. However, in the present machine, I have provided certain additional elements that add to the efficiency of the machine as a whole and the accuracy of the movements of the parts, and I have generally improved the machine in details of construction as will appear.

In practice it has been found desirable and important to provide means for cutting off or severing the stamps or tickets from the strip or roll from which they are fed out of the machine, and I have therefore, devised a simple cutting means actuated at the proper moment to cut the strip, so that a portion of it may be delivered to a suitable compartment, readily accessible to the purchaser. This means not only serves as a cutter, but serves to positively and accurately close the stamp exit opening to prevent an unscrupulous person from having access to, or tampering with the end of the strip within the casing for the purpose of reeling off the stamps or tickets. I also provide a novel construction whereby the machine may be quickly and accurately loaded in such a way that the strip will be fed properly at the first operation of the machine after it has been loaded or a new roll of stamps or tickets put into the machine. The construction is such that the person filling the machine may entirely remove the drum or reel and feed tube, so that the lowermost stamp or ticket can be readily run by hand to the proper point to be engaged by the grippers, when the loaded reel is replaced in the machine. I have also devised a novel means for feeding the coin into the upper end of the coin chute and the construction prevents the insertion of an instrument into the top of the chute to permit an operation of the mechanism. It is also designed to prevent the introduction of an imperfect or improper coin, as will appear.

The machine about to be described is especially designed for vending postage stamps of the denominations of one, five and two cents. As will appear, the construction of the coin feeding devices for the five cent or nickel denomination is such that it will not permit the introduction of a penny or coin of less diameter than a nickel into the main chute, but will, should such improper coin be introduced, direct it to another chute, to be returned to the person inserting it.

The object of the invention is to provide a machine of this character as simple as is consistent with the work to be done and one which will require the simplest instructions to users and which may be readily operated with ease in a reliable and efficient manner and not likely to get out of order.

In the drawings illustrating the invention: Figure 1 is a front elevation of the machine broken away at one end, showing one of the mechanisms in side elevation; Fig. 2 is a horizontal sectional view through a portion of the casing showing the mechanism in top plan; Fig. 3 is a vertical sectional view taken about on line $a$—$a$ of Fig. 2, intended more particularly to show the means for lightly clamping the strip of tickets or stamps above the grippers, so that there will, in operation, be no retrograde movement of the strip; Fig. 4 is a horizontal section taken about on line $b$—$b$ of Fig. 1, the feed tube for the strip being omitted; Fig. 5 is an inverted plan view of the check grippers and cutter; Fig. 6 is a face view of a standard and the means carried thereby for actuating the feed grippers; Fig. 7 is a detail sectional view of a portion of the casing and one of the money drawers, showing the means for locking the drawer from the inside of the casing so that it will be necessary to open the casing before the lock can be manipulated to permit the drawer to be opened; Fig. 8 is a side elevation of the main standard, showing the construction whereby the reel or drum that carries the strip may be removed for re-filling the machine; Fig. 9 is a side elevation of the slide which carries the drum and feed tube; Fig. 10 is a top plan view of the standard shown in Fig. 8; Fig. 11 is a face view of the locking cam carried by the actuating shaft; Fig. 12 is a detail cross sectional view of the jaws of the check gripper and cutter blades, taken on about line c—c of Fig. 5; Fig. 13 is a front elevation of the coin intake casing and a portion of the top plate of the main casing in section, and a portion of the coin chute in elevation, the form here shown of the coin intake casing being that employed in connection with, or appropriate to the one and two cent stamp denominations; Fig. 14 is a side elevation of the intake casing with a portion of the main casing in section; Fig. 15 is a central sectional view of this casing showing the spring backed sliding plunger for feeding the coin from the entrance slot back to the coin chute; and Fig. 16 is a sectional view of the intake casing which I employ in connection with the nickel chute, showing the construction whereby a coin of smaller diameter than a nickel will be prevented from reaching the coin chute.

The mechanism for each denomination of stamps is identical in construction and consequently it will not be necessary to describe more than one mechanism, it being understood that the mechanisms are duplicated throughout the machine to handle the various denominations of stamps or tickets of different denominations or character as the exigencies of the case may require.

Referring to the drawings, the numeral 1 denotes a suitable casing in which the mechanisms are inclosed. The casing is made with a bed plate 2 in which some of the fixed parts of the mechanisms are secured.

The numeral 3 denotes the delivery tube which extends a short distance upward into the casing and is supported at its lower end slightly above the bed plate 2, so as to leave room between the bed plate and the lower end of said tube for the passage of the blade of the cutter for severing the stamps from the strip, as will be described later on. The tube has its side walls cut away, providing slots 4 which permit the jaws of a suitable gripper hereinafter referred to as the feed gripper to engage the postage stamps, tickets or other articles passing through the tube. The stamps, or tickets are indicated by the numeral 5. One side of the drum 6 is provided with a socket 7 for the reception of a short stud 8, carried by a removable slide 9, which is fitted in a tapering recess 10 in the main standard or bracket 11. The core of the drum is provided with a socket 12, for the reception of the short stud 13 carried by one side of the drum. The outer face of the drum is provided with a socket 14 which is entered by a short stud 15 carried by a leaf-spring 16, whose upper end is free and whose lower end is securely fastened at 17, to a laterally extending arm 18 carried by the removable slide 9. The upper end of this spring is free to be moved outwardly to withdraw the stud 15 from the socket in the reel to permit the flanges of the reel to be taken apart so that a roll of tickets or stamps may be slid upon the core, when the parts are replaced and the roll secured upon the drum.

Set into the top of the standard 11 is a thumb screw 19, best shown in Figs. 1 and 2, that has a flange that is cut away at one side as indicated at 20, so that when the screw is partially turned to bring the cut away portion parallel with the rear face of the slide 9, said slide may be readily lifted from its seat in the standard 11. The feed tube 3 and arm 18 are carried by this slide and consequently when the drum is removed, the feed tube will also be removed. This construction makes it convenient for the person loading the machine to put on the new roll of stamps or tickets and feed its lower end downward within the feed tube to the proper point where it will be operated upon by the feed grippers when the machine is started. The lower end of the slide 9 is recessed as indicated at 21, Fig. 9, which recess is entered by a short stud 22, near the lower part of the recess 10 in the standard 11. This stud 22, together with the taper of the recess 10 limits the downward movement of the slide 9, and makes it certain that the slide 9 will always rest at the same point within the standard. The slide 9 is locked firmly in place by the flange of the thumb screw 19, whose broader portion at this time is turned over the top of the slide.

The standard 11 supports a sliding block or carrier 23, which has two ribs 24 on its rear side which fit snugly in a similarly shaped groove 25 in the face of the bracket 11. Projecting downwardly from the sliding block or carrier 23 is a short stud 26, upon which the feed gripper 27 is pivoted. One end of said feed gripper is formed with jaws 28 which may be faced with rubber or other suitable material which is adapted to engage the strip of stamps through the slots 4 in the delivery tube 3. The opposite ends 29 of said gripper are adapted to contact with guide flanges 30 projecting from the face of an upright standard or bracket 31 secured firmly to the bed plate 2. This bracket is further formed with outside flanges 32 with shoulders 33 against which, at some time in the operation of the feed grippers, as will appear later on, the ends of the grippers engage.

The numeral 34 designates a spring firmly secured to the bracket at 35. This spring extends upwardly between the flanges 30 and its upper ends are bent into V-shape form presenting arms 36, which forcefully throw the rear arms of the feed gripper apart, as they pass between the arms 36 of the spring and the flanges 30. This brings the forward ends 28 of the grippers forcefully together to grip the strip of stamps or tickets, and when, in the downward movement of the block or carrier 23, the ends 29 of the feed gripper ride on the outside of the flanges 30, the jaws of the gripper will be held firmly together against the strip and feed the strip downward the desired distance until the rear ends of the gripper have passed below the lower ends of the flanges 30, when said ends will be quickly drawn together by a means about to be described, to cause the jaws 28 to open and release the strip for the next upward movement of the feed gripper.

The numeral 37 designates the safety or check gripper, which is below the feed gripper and is relatively fixed, its members being pivoted together at 38 on the bed plate. This gripper is provided with jaws 39 which grip and hold the strip of stamps or tickets at proper times. The members of this gripper at the ends opposite the pivot 38 carry vertical pins 40 which extend upward and are guided between ears 41 upon the outer face of the enlargements 42 of the arms of the feed gripper.

Interposed between the free ends of the check gripper is a spiral spring 43 whose ends are looped around the pins 40. This spring exerts a constant tendency to keep the check gripper closed and it is only when the members of said gripper are positively forced apart by the movement of the feed gripper, that the check gripper is opened. However, when the ends 29 of the feed gripper pass below the lower ends of the flanges 30, where the arms of the feed grippers are free to move, this spring 43 acting through the pins 40, quickly draws the rear arms of the feed gripper together, opening the jaws 28 to release the strip preparatory to the upward movement of said feed gripper.

The feed tube 3 as clearly shown in Fig. 1 ends just above the check gripper and permits the jaws of the check gripper to come together below the tube. Below the check gripper, the bed plate is cut out to make room for a knife or cutter 44 which comprises a blade 45 pivoted at 46 to the bed plate, and a blade 47 carried by one arm of the check gripper, shown best in Figs. 1, 4 and 5. The rear end of the blade 45 is bifurcated as indicated at 48 and embraces a short stud 49 carried by one member of the check gripper, so that the movement of the check gripper in closing to grip the strip of stamps or tickets, will also operate the blade 45 with a quick movement. The blade 45 has a sharp edge which co-acts with the sharp edge of the blade 47 carried by the arm of the check gripper, so that the pivoted blade sweeps completely across the fixed blade and exit opening, producing a clean shear cut throughout the entire length of the stamp or ticket. It will be noted that when the blades come together, or overlap at the instant of the cutting operation, the exit opening in the bed plate of the machine will be completely closed, thus preventing access to the lower end of the strip. The movement of the pivoted blade 45 is considerably greater and quicker than the movement of the blade 47, due to the location of its pivotal point, and to the length of the arms of the blade on each side of said pivot.

Pivoted at 50 to the front face of the sliding block 23 is a pitman or link 51 whose upper end is pivoted at 52 to the lower end of a short crank 53, carried by the inner end of the operating shaft 54, mounted in suitable bearings in the front of the casing. The outer end of this shaft is provided with an operating handle or knob 55 by means of which the shaft may be rotated when unlocked by the deposit of a coin in the coin chute to slide or reciprocate the sliding block or carriage to operate the grippers, as will appear. The shaft 54 carries a cam 56 having a shoulder 57 which is engaged by the end 58 of a pawl 59 pivotally supported upon a short stud 60 suitably secured to the casing. The pawl is provided with a slot 61 which receives the short pin 62 carried by a depending arm 63 carried by the operating lever 64. The operating lever is pivoted at 65 upon a short shaft suitably secured to the casing and its forward end extends laterally and enters a slot 66 in the coin chute 67. This lever is formed with a cup-shaped end 68 adapted to receive the coin as it passes into the chute. The lever is balanced by a weight 69 adjustable upon an arm 70, which is secured to the rear end of said lever. When the coin is dropped into the chute, its weight rocks the arm 64 of the lever downward and through the connection between the lever and the pawl 59, said pawl is rocked, lifting its end 58 out of engagement with the shoulder on the cam. The knob 55 and operating shaft carried thereby are now free to be turned. However, the weight of the coin is only sufficient to lift the pawl from engaging with the shoulder, but the turning of the operating shaft and the cam 56 carried thereby will bring the high portion $a$ of the cam into engagement with the end 28 of the pawl and with a positive movement, the pawl will be rocked on its pivot, thus depressing the lever 64 until it has been rocked sufficiently to swing its end 68 out of the path of movement of the coin, when said coin will pass through the chute into the money receptacle or drawer.

I provide a ratchet wheel 71 upon the shaft 54 which wheel is engaged by a pawl 72 to prevent the shaft from being turned backward.

Mounted in a guide plate 73, carried by the arm 18 of the slide 9 is a clamping block 74 which is preferably of the same width as the strip. This block is forced forward by a spiral spring 75 surrounding a tension screw 76. The purpose of this device is to keep the strip of stamps or tickets pressed lightly against the front plate of the feed tube, so as to prevent retrograde or other undesirable movement of the strip in the feed and cutting operation.

Within the casing, below the bed plate 2 I arrange three money drawers 77, 78 and 79. These drawers are held locked by a spring pressed bolt 80, mounted in a casing 81 secured to the rear plate of the main casing. The bolt is provided with a locking end 82 which engages the rear edge 83 of the drawer. Attached to the bolt is a headed rod 84 which may be lifted against the influence of the spring to cause the locking end to disengage the drawer to permit it to be pulled out to empty its contents. This locking means can only be reached from the inside of the casing by those authorized to have access to the interior of the machine. The top of the casing is preferably hinged to the body and is provided with a clasp 85 which fits over a staple 86 adapted to receive the yoke of a pad-lock 87 as shown.

Below the feed tube of each mechanism I provide a receptacle 87' for the stamps or tickets as they are fed individually from the machine. These receptacles are open at their front ends, so that the purchaser may readily insert a finger to remove the stamp or ticket.

Each mechanism has an appropriate coin chute, opening at its lower end into the money drawer beneath it. The construction of the means for feeding the coin to the chutes appropriate to the one and two cent denominations is the same but certain modifications and additions are contrived in connection with the five cent denomination to meet the conditions which prevail, as will now be described.

The construction of the casings for the one and two cent denominations will now be described, reference being particularly directed to Figs. 13, 14, 15 and 16. The numeral 88 designates a casing bolted to the top plate or cover of the main casing. This casing 88 is provided with a coin slot 89 which registers with an opening 90 made through a round plunger 91. The plunger is formed of two cylindrical pieces, held together by two oppositely disposed side ribs 92, which slide in a guide way 93 formed within the casing. A push button 94 has its shank passing through an opening 95 in the front of the casing and the inner end of the shaft of the push button is firmly secured to the plunger. The plunger is backed by a spiral spring 96 let into a socket in the rear face of the plunger and having its opposite end seated in a cup 97. This spring obviously keeps the plunger in normal position in the front of the casing, where its slot will register with the coin slot 89. The bottom of the casing 88 has a slot 99 therethrough, which registers with a slot 98 in the cover or top of the main casing, and this last mentioned slot registers with the open upper end of the coin chute 67. When the coin is inserted in the slot 89, it falls to the bottom of the casing 88, but cannot of course, reach the coin chute by this direct course, but must be carried back to the mouth of the coin chute, which obviously is done when the button is pushed and the plunger carried back until the opening through the plunger registers with the slot 99 in the bottom of the casing 88, when the coin will drop into the coin chute.

Referring particularly to Fig. 16, here is shown the intake casing appropriate to the mechanism for delivering the five cent stamp. The construction so far as the means for feeding the coin from the front of the casing to the rear, does not differ from that described for the other denominations, but in this case, I provide an additional chute 99', which does not lead to the coin chute through which the proper coin must pass to unlock the mechanism, but may lead to any suitable point in the lower part of the casing, where the person inserting the improper coin, say a cent instead of a nickel, will have the coin returned, as a penny being of smaller diameter than a nickel, will at once pass completely through the coin slot 100, through the opening in the plunger and through the opening 101 in the bottom of this casing and through the chute 99', through which it may be returned to the person who has inserted it, or trapped, as may be desired. On the other hand, the diameter of the chamber within the casing 88' is such that a nickel will not pass through the opening 101 in the plunger, but is supported at its edges within the opening in the plunger, so that when the plunger is moved back in the casing, the nickel which is the proper coin, will be carried back to the point where it will be dropped into the chute 67, which chute is of proper width to receive it.

In operation, the proper coin is dropped into the coin slot, and when, by the manipulation of the push button, it is carried back in the casing 88 by the plunger and dropped into the coin chute, it will fall upon the end 68 of the operating lever 64 and its weight will depress the lever, which will lift the pawl 59 out of engagement with the shoulder of the cam 56. The knob 55 can now be turned and by turning it forward, the sliding block or carrier 23 will be moved upward by reason of the link or pitman connection 51. As this carrier moves upward, the feed gripper will be carried with it, it being understood that the feed gripper is now open, and as this gripper moves upward its ends 29 will, when they have passed above the upper ends of the flanges 30, be forced outward by the arms 36 of the spring 34, thus closing the ends 28 of the feed gripper upon the strip of stamps or tickets. A further movement of the knob 55 and operating shaft 54 will carry the sliding block or carrier downward and during this downward movement, the ends 29 of the feed gripper will closely engage the outer faces of the flanges 30, thus keeping the gripper ends firmly together, against the stamp or ticket, feeding it downward the desired distance. When the ends 29 of the feed gripper pass below the lower ends of the flanges 30, the spiral spring 43, carried by the check gripper will bring the pins 40 into engagement with the enlargements 42 of the feed gripper arms and open the jaws 28 of said gripper. At this moment, the spring closes the check gripper, whose jaws firmly grip the strip of stamps or tickets, and further the closing of the check gripper operates the cutter 44 to sever the lowermost stamp or ticket and permit it to drop through the exit opening of the feed tube. As before stated, and as shown in Fig. 12, the knife blades overlap, so that the lower end of the strip cannot be reached or tampered with for the purpose of reeling off the stamps or tickets.

In purchasing a two cent stamp, it is necessary to insert one penny at a time and manipulate the push button twice. With this denomination, the operating lever is so balanced that the weight of the two coins will be sufficient to lift the pawl from engagement with the cam 56.

Claims.

1. In a machine for vending stamps, tickets, and similar articles, a feed mechanism comprising a vertically reciprocatory block or carriage carrying a feed gripper, and a fixed check gripper arranged below the feed gripper and adapted to be opened by the closing of said gripper, in combination with means alternately opening and closing both grippers, and means actuated by the check gripper to sever the article being fed and simultaneously close the exit to the feed opening.

2. In a machine for vending stamps, etc., a feed mechanism consisting of a vertically reciprocatory block or carriage carrying a feed gripper, and a fixed check gripper arranged below said feed gripper and adapted to be opened by the closing of the feed gripper, and means alternately opening and closing both grippers, in combination with means adapted to be actuated by the closing of the check gripper to sever the article being fed, and simultaneously close the exit opening and to be withdrawn by the opening of said check grippers.

3. In a machine for vending stamps, etc., a feed mechanism consisting of a feed gripper pivotally mounted on a vertically reciprocatory block or carriage, and a fixed check gripper pivoted below said feed gripper and adapted to be opened by the closing of the feed gripper to release its grip on the article being fed, in combination with means actuated by the check gripper to sever said article and simultaneously close the exit to the feed opening.

4. In a machine for vending stamps, etc., a feed mechanism comprising a feed gripper pivotally mounted on a vertically reciprocatory block or carriage, a fixed check gripper pivoted below said feed gripper and adapted to be opened by the closing of the feed gripper, and means closing said feed gripper to cause the check gripper to release its grip on the article being fed, in combination with means actuated by the closing of the check gripper to sever the article being fed and simultaneously close the exit opening, and to be withdrawn by the opening of said check grippers.

5. In a machine for vending articles from a continuous strip, a feed mechanism, for feeding a portion of the strip at a time, consisting of a reciprocatory feed gripper, a relatively fixed check gripper, and means operating the feed and check grippers alternately, in combination with a cutting mechanism arranged below the check gripper and operated thereby.

6. In a machine for vending articles from a continuous strip, a mechanism for feeding a portion of the strip at a time, said mechanism consisting of a reciprocatory feed gripper, a relatively fixed check gripper, and means operating the feed and check grippers alternately, in combination with a cutting mechanism arranged below the check gripper and operated thereby to sever the article being fed and close the exit opening by the closing of said check gripper.

7. In a machine for vending stamps, tickets and like articles from a continuous strip, an automatic feed mechanism composed of a vertically reciprocatory feed gripper, a fixed check gripper arranged below the feed gripper, and adapted to be opened by the closing of the feed gripper, means for alternately opening and closing both grippers, cutting means adapted to be actuated by the closing of the check gripper to sever the article and simultaneously close the exit to the feed opening, said cutting device being also actuated by the opening of the check gripper to open the feed exit opening to permit the article to be fed out of the machine.

8. In a machine for vending stamps, tickets and like articles from a continuous strip, an automatic feed mechanism composed of a feed gripper pivotally mounted on a vertically reciprocatory block or carriage, a fixed check gripper pivoted below the feed gripper and adapted to be opened by the closing of the feed gripper, means closing said feed gripper to cause the check gripper to release its grip on the article being fed, and a cutting means operated by the closing of the check grippers for severing the article from the strip, when it has been fed the desired distance.

9. In a machine for vending stamps, tickets and like articles, an automatic feed mechanism composed of a feed gripper pivotally mounted on a vertically reciprocating block or carriage, a fixed check gripper pivoted below said feed gripper and adapted to be opened by the closing of the feed gripper, means closing said feed gripper to cause the check gripper to release its grip on the article being fed, and a cutting means actuated by the closing of the check gripper to sever the article from the strip when it has been fed the desired distance, and withdrawn by the opening of said gripper.

10. In a machine for vending stamps, tickets and like articles from a continuous strip, in combination, a mechanism for feeding a part of the strip at a time, a removable block supported within the casing, a drum or reel carried by said block, and adapted to carry the stamps or tickets to be vended, a delivery tube carried by the removable block through which the stamps, tickets or like articles pass in being fed out of the machine and means for locking said block firmly in its support.

11. In a machine of the character described, the combination of a relatively fixed check gripper, a reciprocating feed gripper, means to operate the feed and check grippers in alternation, and a cutter actuated by the check gripper to sever the stamp or ticket from the strip from which it is fed.

12. In a machine for vending stamps, tickets or like articles from a continuous strip, a relatively fixed check gripper, a reciprocating feed gripper, means for operating the feed and check grippers in alternation, a cutter comprising a blade carried by one of the elements of the check gripper and a blade pivoted below the check gripper, connections between the pivoted blade and one of the elements of the check gripper, whereby, when the check gripper is closed, the stamp or ticket will be severed from the strip.

13. In a machine for vending stamps, tickets or like articles from a continuous strip, a relatively fixed check gripper, a reciprocating feed gripper, means for operating the feed and check grippers in alternation, a cutter comprising a blade attached to one of the elements of the check gripper and a blade pivoted below the check gripper and having an arm extending to the end of the check gripper, means carried at the end of the check gripper engaging the blade, to rock it on its pivot when the check gripper is closed, so that the pivoted blade will co-act with the blade carried by the check gripper to sever the stamp or ticket from the strip, the blade of the cutter being adapted to close the exit opening, substantially as and for the purpose set forth.

14. In a machine for vending articles from a continuous strip, a removable feed slide or block supported within the casing, a drum or reel carried by said slide, a feed tube or chute carried by the feed slide, and means for unlocking the parts, whereby they may be removed when it is desired to reload the drum.

15. In a machine for vending articles from a continuous strip, a removable feed slide or block supported within the casing, a drum or reel carried by said chute, a feed tube or chute carried by the feed slide, means for locking said slide to its support and for permitting its removal therefrom, and also the drum and feed tube.

In testimony whereof I affix my signature in presence of two witnesses.

EDWARD D. SCHMITT.

Witnesses:
TITIAN W. JOHNSON,
CARY D. HALL, Jr.